US012199841B2

(12) United States Patent
Gupta et al.

(10) Patent No.: US 12,199,841 B2
(45) Date of Patent: Jan. 14, 2025

(54) USER-DEFINED EXTERNAL SUPPORT REQUEST ROUTING PLATFORM

(71) Applicants: Atlassian Pty Ltd., Sydney (AU); ATLASSIAN US, INC., San Francisco, CA (US)

(72) Inventors: Rahul Gupta, Telangana (IN); Basak Meral, Ankara (TR); Batuhan Kama, Ankara (TR); Gokce Erdogan, Istanbul (TR)

(73) Assignees: Atlassian PTY Ltd, Sydney (AU); Atlassian US, Inc., San Francisco, CA (US)

( * ) Notice: Subject to any disclaimer, the term of this patent is extended or adjusted under 35 U.S.C. 154(b) by 0 days.

(21) Appl. No.: 17/936,641

(22) Filed: Sep. 29, 2022

(65) Prior Publication Data
US 2024/0113948 A1     Apr. 4, 2024

(51) Int. Cl.
*H04L 41/5074* (2022.01)
*G06Q 30/016* (2023.01)
*H04L 41/5061* (2022.01)

(52) U.S. Cl.
CPC ....... *H04L 41/5074* (2013.01); *G06Q 30/016* (2013.01); *H04L 41/5064* (2013.01)

(58) Field of Classification Search
CPC .................................................... G06Q 30/01
See application file for complete search history.

(56) References Cited

U.S. PATENT DOCUMENTS

| | | | |
|---|---|---|---|
| 2008/0172574 A1* | 7/2008 | Fisher ...................... | G06N 5/02 714/25 |
| 2015/0113628 A1* | 4/2015 | Deshmukh ............ | H04L 63/102 726/10 |
| 2021/0014136 A1* | 1/2021 | Rath ..................... | G06Q 30/016 |
| 2021/0135959 A1* | 5/2021 | Ricks ..................... | G06Q 10/20 |
| 2021/0135960 A1* | 5/2021 | Bellini, III ............. | G06F 11/00 |
| 2023/0140553 A1* | 5/2023 | Mahindru ........ | G06Q 10/06375 705/7.37 |

\* cited by examiner

*Primary Examiner* — Philip J Chea
*Assistant Examiner* — James Ross Hollister
(74) *Attorney, Agent, or Firm* — Alston & Bird LLP

(57) ABSTRACT

Embodiments provide a user-defined external support request routing platform for routing a client support request initiated by a client computing device associated with an external communications platform. Embodiments also include receiving a support communications integration definition object comprising an external communications platform type identifier, an external communications platform provider identifier, an external communications platform address, and an external communications platform credential. In response to receiving the support communications integration definition object, embodiments update a support communications platform integration associated with an external communications support request routing system. Embodiments also include parsing a client support request to identify support routing data and determining a designated external communications platform address and a designated external communications platform credential from the support communications platform integration based on the support routing data. Embodiments also include causing output of the client support request to the designated external communications platform address and initiating a client support session.

20 Claims, 6 Drawing Sheets

```
500 ─▶
```

RECEIVE, VIA AN EXTERNAL COMMUNICATIONS SUPPORT REQUEST ROUTING SYSTEM, A SUPPORT COMMUNICATIONS INTEGRATION DEFINITION OBJECT COMPRISING AN EXTERNAL COMMUNICATIONS PLATFORM TYPE IDENTIFIER, AN EXTERNAL COMMUNICATIONS PLATFORM PROVIDER IDENTIFIER, AN EXTERNAL COMMUNICATIONS PLATFORM ADDRESS, AND AN EXTERNAL COMMUNICATIONS PLATFORM CREDENTIAL
502

↓

UPDATE A SUPPORT COMMUNICATIONS PLATFORM INTEGRATION IN A CONFIGURATION DATA STORE IN RESPONSE TO RECEIVING THE SUPPORT COMMUNICATIONS INTEGRATION DEFINITION OBJECT
504

↓

UPDATE AN EXTERNAL COMMUNICATIONS PLATFORM TYPE SET TO INCLUDE THE EXTERNAL COMMUNICATIONS PLATFORM TYPE IDENTIFIER
504A

↓

UPDATE AN EXTERNAL COMMUNICATIONS PLATFORM PROVIDER SET TO INCLUDE THE EXTERNAL COMMUNICATIONS PLATFORM PROVIDER IDENTIFIER
504B

↓

UPDATE AN EXTERNAL COMMUNICATIONS PLATFORM ADDRESS SET TO INCLUDE THE EXTERNAL COMMUNICATIONS PLATFORM ADDRESS
504C

↓

UPDATE AN EXTERNAL COMMUNICATIONS PLATFORM CREDENTIAL SET TO INCLUDE THE EXTERNAL COMMUNICATIONS PLATFORM CREDENTIAL
504D

↓

PARSE A CLIENT SUPPORT REQUEST TO IDENTIFY SUPPORT ROUTING DATA
506

↓

DETERMINE A DESIGNATED EXTERNAL COMMUNICATIONS PLATFORM ADDRESS AND A DESIGNATED EXTERNAL COMMUNICATIONS PLATFORM CREDENTIAL FROM THE SUPPORT COMMUNICATIONS PLATFORM INTEGRATION BASED ON THE SUPPORT ROUTING DATA
508

CAUSE OUTPUT OF THE CLIENT SUPPORT REQUEST TO THE DESIGNATED EXTERNAL COMMUNICATIONS PLATFORM ADDRESS
510

600 ⟶

```
┌─────────────────────────────────────────────────────────────────────┐
│  EXTRACT REQUEST RECORD DATA FROM ONE OR MORE SUPPORT REQUEST RECORD │
│  FILES ASSOCIATED WITH ONE OR MORE PRIOR CLIENT SUPPORT SESSIONS,    │
│  WHERE THE ONE OR MORE SUPPORT REQUEST RECORD FILES COMPRISE AUDIO   │
│  FILES, VIDEO FILES, AND TRANSCRIPTION FILES                         │
│                              602                                     │
└─────────────────────────────────────────────────────────────────────┘
                                  ↓
┌─────────────────────────────────────────────────────────────────────┐
│    TRAIN A PREDICTIVE MACHINE LEARNING MODEL ON A TRAINING DATA SET, │
│  WHERE THE TRAINING DATA SET COMPRISES THE SUPPORT REQUEST RECORD    │
│                             DATA                                     │
│                              604                                     │
└─────────────────────────────────────────────────────────────────────┘
                                  ↓
┌─────────────────────────────────────────────────────────────────────┐
│   EMPLOY THE PREDICTIVE MACHINE LEARNING MODEL TO GENERATE INSIGHT   │
│   DATA RELATED TO THE USER-DEFINED EXTERNAL SUPPORT REQUEST ROUTING  │
│   PLATFORM, WHERE THE INSIGHT DATA COMPRISES USAGE STATISTICS AND    │
│ RECOMMENDATIONS, AND WHERE THE RECOMMENDATIONS ARE ASSOCIATED WITH   │
│    IMPROVING THE EFFICIENCY OF A USER-DEFINED EXTERNAL SUPPORT       │
│  REQUEST ROUTING PLATFORM, OPTIMIZING COSTS, REDUCING OPERATIONAL    │
│             REDUNDANCY, AND INCREASING SCALABILITY                   │
│                              606                                     │
└─────────────────────────────────────────────────────────────────────┘
```

*FIG. 6*

USER-DEFINED EXTERNAL SUPPORT REQUEST ROUTING PLATFORM

TECHNICAL FIELD

Embodiments of the present disclosure are generally directed to an enterprise-level external support request routing system configured to integrate with a plurality of external communications tools offered by external communications platforms in order to resolve support requests related to adverse client issues.

BACKGROUND

Managing client support requests can be an untenable task for companies offering enterprise-level software applications and services. Routing support calls, emails, chats, and/or other forms of correspondence to the appropriate representative in the correct department can be difficult, especially today when many companies' call-center and support representatives are working from dispersed locations. Applicant has discovered various technical problems associated with conventional support request routing tools. Through applied effort, ingenuity, and innovation, Applicant has solved many of these identified problems by developing the embodiments of the present disclosure, which are described in detail below.

BRIEF SUMMARY

In one aspect, a computer-implemented method includes receiving, via an external communications support request routing system, a support communications integration definition object comprising an external communications platform type identifier, an external communications platform provider identifier, an external communications platform address, and an external communications platform credential. The computer-implemented method also includes updating a support communications platform integration in a configuration data store in response to receiving the support communications integration definition object. The computer-implemented method also includes updating an external communications platform type set to include the external communications platform type identifier. The computer-implemented method also includes updating an external communications platform provider set to include the external communications platform provider identifier. The computer-implemented method also includes updating an external communications platform address set to include the external communications platform address. The computer-implemented method also includes updating an external communications platform credential set to include the external communications platform credential. The computer-implemented method also includes parsing a client support request to identify support routing data. The computer-implemented method also includes determining a designated external communications platform address and a designated external communications platform credential from the support communications platform integration based on the support routing data. The computer-implemented method also includes causing output of the client support request to the designated external communications platform address.

The computer-implemented method further includes where the designated external communications platform address is associated with the designated external communications platform credential. The computer-implemented method also includes validating the designated external communications platform address, where the designated external communications platform address comprises at least one of a unique IP address, MAC address, API endpoint address, network component address, server system address, email address, phone number, or any other unique computer-readable address associated with a particular external communications platform. The computer-implemented method also includes validating the designated external communications platform credential, where the designated external communications platform credential comprises a particular external communications platform provider identifier and an authentication key associated with the particular external communications platform provider identifier.

The computer-implemented method further includes where causing the output of the client support request includes initiating a client support session in association with the designated external communications platform address.

The computer-implemented method further includes where the external communications platform provider set comprises one or more external communications platform provider identifiers associated with one or more respective external communications platform providers offering at least one service related to facilitating a phone call, VOIP call, video call, group chat channel, email channel, or direct SMS messaging channel, and where the client support session comprises an engagement of the at least one service provided by the one or more respective external communications platform providers.

The computer-implemented method further includes connecting a client computing device associated with a particular external communications platform provider to one or more support computing devices associated with the external communications support request routing system, where the client computing device is associated with the designated external communications platform address.

The computer-implemented method further includes connecting the client computing device to the one or more support computing devices based on an on-call support device schedule, where the on-call support device schedule comprises an active list of the one or more support computing devices that are capable of communicating to the client computing device.

The computer-implemented method further includes extracting request record data from one or more support request record files associated with one or more prior client support sessions, where the one or more support request record files comprise audio files, video files, and transcription files. The computer-implemented method also includes training a predictive machine learning model on a training data set, where the training data set comprises the support request record data.

The computer-implemented method further includes employing the predictive machine learning model to generate insight data related to the external communications support request routing system, where the insight data comprises usage statistics and recommendations to optimize operational efficiency, costs, and scalability of the external communications support request routing system.

In one aspect, a computer program product includes at least one non-transitory computer-readable storage medium. The computer program product also includes computer-readable program code portions configured to receive, via an external communications support request routing system, a support communications integration definition object comprising an external communications platform type identifier, an external communications platform provider identifier, an external communications platform address, and an external communications platform credential. The computer program product also includes computer-readable program code portions configured to update a support communications platform integration in a configuration data store in response to receiving the support communications integration definition object. The computer program product also includes computer-readable program code portions configured to update an external communications platform type set to include the external communications platform type identifier. The computer program product also includes computer-readable program code portions configured to update an external communications platform provider set to include the external communications platform provider identifier. The computer program product also includes computer-readable program code portions configured to update an external communications platform address set to include the external communications platform address. The computer program product also includes computer-readable program code portions configured to update an external communications platform credential set to include the external communications platform credential. The computer program product also includes computer-readable program code portions configured to parse a client support request to identify support routing data. The computer program product also includes computer-readable program code portions configured to determine a designated external communications platform address and a designated external communications platform credential from the support communications platform integration based on the support routing data. The computer program product also includes computer-readable program code portions configured to cause output of the client support request to the designated external communications platform address.

The computer program product further includes where the designated external communications platform address is associated with the designated external communications platform credential. The computer program product also includes computer-readable program code portions configured to validate the designated external communications platform address, where the designated external communications platform address comprises at least one of a unique IP address, MAC address, API endpoint address, network component address, server system address, email address, phone number, or any other unique computer-readable address associated with a particular external communications platform. The computer program product also includes computer-readable program code portions configured to validate the designated external communications platform credential, where the designated external communications platform credential comprises a particular external communications platform provider identifier and an authentication key associated with the particular external communications platform provider identifier.

The computer program product further includes where causing the output of the client support request includes initiating a client support session in association with the designated external communications platform address.

The computer program product further includes where the external communications platform provider set comprises one or more external communications platform provider identifiers associated with one or more respective external communications platform providers offering at least one service related to facilitating a phone call, VOIP call, video call, group chat channel, email channel, or direct SMS messaging channel, and where the client support session comprises an engagement of the at least one service provided by the one or more respective external communications platform providers.

The computer program product further includes computer-readable program code portions configured to connect a client computing device associated with a particular external communications platform provider to one or more support computing devices associated with the external communications support request routing system, where the client computing device is associated with the designated external communications platform address.

The computer program product further includes computer-readable program code portions configured to connect the client computing device to the one or more support computing devices based on an on-call support device schedule, where the on-call support device schedule comprises an active list of the one or more support computing devices that are capable of communicating to the client computing device.

The computer program product further includes computer-readable program code portions configured to extract request record data from one or more support request record files associated with one or more prior client support sessions, where the one or more support request record files comprise audio files, video files, and transcription files. The computer program product also includes computer-readable program code portions configured to train a predictive machine learning model on a training data set, where the training data set comprises the support request record data.

The computer program product further includes computer-readable program code portions configured to employ the predictive machine learning model to generate insight data related to the external communications support request routing system, where the insight data comprises usage statistics and recommendations to optimize operational efficiency, costs, and scalability of the external communications support request routing system.

In one aspect, a system includes one or more computers. The system also includes one or more storage devices storing instructions that are operable, when executed by the one or more computers, to cause the one or more computers to receive, via an external communications support request routing system, a support communications integration definition object comprising an external communications platform type identifier, an external communications platform provider identifier, an external communications platform address, and an external communications platform credential. The system also includes instructions to cause the one or more computers to update a support communications platform integration in a configuration data store in response to receiving the support communications integration definition object. The system also includes instructions to cause the one or more computers to update an external communications platform type set to include the external communications platform type identifier. The system also includes instructions to cause the one or more computers to update an external communications platform provider set to include the external communications platform provider identifier. The system also includes instructions to cause the one or more computers to update an external communications platform address set to include the external communications platform address. The system also includes instructions to cause the one or more computers to update an external communications platform credential set to include the external communications platform credential. The system also includes instructions to cause the one or more computers to parse a client support request to identify support routing data. The system also includes instructions to cause the one or more computers to determine a designated external communications platform address and a designated external communications platform credential from the support communications platform integration based on the support routing data. The system also includes instructions to cause the one or more computers to cause output of the client support request to the designated external communications platform address.

The system further includes where the designated external communications platform address is associated with the designated external communications platform credential. The system also includes instructions to cause the one or more computers to validate the designated external communications platform address, where the designated external communications platform address comprises at least one of a unique IP address, MAC address, API endpoint address, network component address, server system address, email address, phone number, or any other unique computer-readable address associated with a particular external communications platform. The system also includes instructions to cause the one or more computers to validate the designated external communications platform credential, where the designated external communications platform credential comprises a particular external communications platform provider identifier and an authentication key associated with the particular external communications platform provider identifier.

The system further includes where the instructions to cause the output of the client support request include initiating a client support session in association with the designated external communications platform address.

The system further includes where the external communications platform provider set comprises one or more external communications platform provider identifiers associated with one or more respective external communications platform providers offering at least one service related to facilitating a phone call, VOIP call, video call, group chat channel, email channel, or direct SMS messaging channel, and where the client support session comprises an engagement of the at least one service provided by the one or more respective external communications platform providers.

The system further includes instructions to cause the one or more computers to connect a client computing device associated with a particular external communications platform provider to one or more support computing devices associated with the external communications support request routing system, where the client computing device is associated with the designated external communications platform address.

The system also includes instructions to cause the one or more computers to connect the client computing device to the one or more support computing devices based on an on-call support device schedule, where the on-call support device schedule comprises an active list of the one or more support computing devices that are capable of communicating to the client computing device.

The system further includes instructions to cause the one or more computers to extract request record data from one or more support request record files associated with one or more prior client support sessions, where the one or more support request record files comprise audio files, video files, and transcription files. The system also includes instructions to cause the one or more computers to train a predictive machine learning model on a training data set, where the training data set comprises the support request record data.

The system further includes instructions to cause the one or more computers to employ the predictive machine learning model to generate insight data related to the external communications support request routing system, where the insight data comprises usage statistics and recommendations to optimize operational efficiency, costs, and scalability of the external communications support request routing system.

BRIEF DESCRIPTION OF THE SEVERAL VIEWS OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein. To easily identify the discussion of any particular element or act, the most significant digit or digits in a reference number refer to the figure number in which that element is first introduced.

FIG. 5 illustrates a flowchart representing a process 500 for configuring an external communications support request routing system and routing a client support request in accordance with one or more embodiments of the present disclosure.

FIG. 6 illustrates a flowchart representing a process 600 for initiating a client support session and harvesting request record data from said client support session for training a predictive machine learning model in accordance with one or more embodiments of the present disclosure.

DETAILED DESCRIPTION

Figure 1:
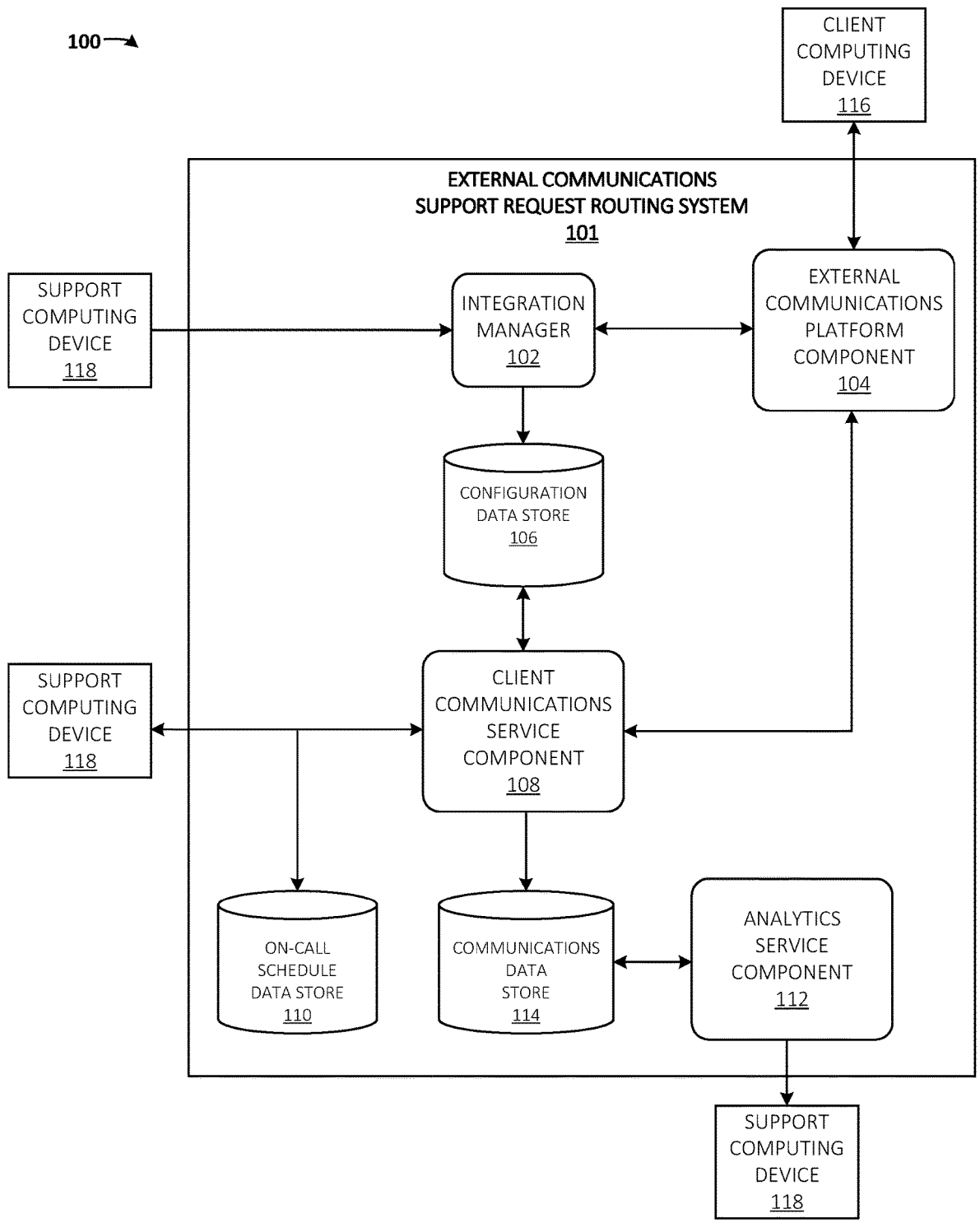
FIG. 1 is a block diagram of an exemplary user-defined external support request routing platform architecture in accordance with one or more embodiments of the present disclosure.

Various embodiments of the present disclosure now will be described more fully hereinafter with reference to the accompanying drawings, in which some, but not all, embodiments of the disclosure are shown. Indeed, embodiments of the disclosure may be embodied in many different forms and should not be construed as limited to the embodiments set forth herein, rather, these embodiments are provided so that this disclosure will satisfy applicable legal requirements. The terms "illustrative," "example," and "exemplary" are used to be examples with no indication of quality level. Like numbers refer to like elements throughout.

Overview

For companies offering enterprise-level software applications and services, routing customer support calls, emails, chats, and/or other forms of correspondence to the appropriate representative in the correct department can be difficult, especially today when many companies' call-center and support representatives are working from dispersed locations. The companies offering such enterprise-level software applications and services can vary in scale and scope, and therefore their communications needs can vary greatly. For instance, a small technical startup may have different communications needs than a multi-national SAAS enterprise. Where the small technical startup may have a few staff members handling a broad range of technical customer support requests, the multi-national SAAS enterprise may have to address technical customer support requests in addition to various other requests and filter them amongst one or more departments such as human resource departments, IT helpdesks, software development teams, sales and marketing departments, and/or the like. Applicant has identified a need for a seamless and customizable external support request routing platform that can scale, shift, and grow to handle any network and computational complexities that arise from handling support requests proffered by enterprise customers of varied size and scope.

Various embodiments of the present disclosure are directed to a user-defined external support request routing platform that is configured to integrate an alerting and incident management system with a plurality of external communications platforms such that an enterprise can seamlessly provide customer support while utilizing an enterprise's preferred communications platforms. In many instances, an enterprise may utilize an external communications platform with a plurality of predefined phone numbers, networking endpoint addresses, email addresses, chat channels or group chat nomenclature policies, and the like by which end users are to seek technical support.

In preferred embodiments, a communications-platform-agnostic system is provided such that an enterprise can integrate an alerting and incident management system (e.g., Opsgenie® by Atlassian®) with one or more of its preferred external communications platforms in order to maintain their current phone numbers, email addresses, networking endpoint address, etc., while providing continuity of support as they grow and/or change service platforms. Additionally or alternatively, the user-defined external support request routing platform can be configured to generate one or more custom phone numbers, email addresses, and/or networking endpoint addresses for routing external client support requests to various departments within the enterprise.

In various embodiments, the user-defined external support request routing platform can integrate with one or more external communications platforms, facilitate one or more real-time communication methods (e.g., phone calls, video calls, chat channels, SMS messaging channels, and/or the like), and analyze usage and/or interaction data related to the various components of the user-defined external support request routing platform.

Preferred embodiments of an exemplary user-defined external support request routing platform embody an external communications support request routing system comprising an integration manager, an external communications platform component, a configuration data store, a client communications service component, an on-call schedule data store, an analytics service component, and a communications data store. Additionally, in one or more embodiments, the external communications support request routing system of an exemplary user-defined external support request routing platform can integrate with, or be embodied by, a client computing device and/or a support computing device.

The external communications support request routing system can receive a support communications integration definition object from a support computing device, where the support communications integration definition object comprises metadata that the integration manager can employ to update a support communications platform integration. The support communications platform integration is used to configure the external communications support request routing system to facilitate the routing of client support requests for a particular enterprise employing an embodiment of the user-defined external support request routing platform.

The external communications support request routing system, by way of the integration manager, can fetch, configure, update, and/or store data related to one or more external communications platforms in a configuration data store. The integration manager can also fetch and employ various data and platform functionalities from the external communications platform component. The external communications platform component can interface with one or more preferred external communications platforms such that the external communications support request routing system associated with a particular enterprise can be configured to utilize the one or more preferred external communications platforms. For example, the external communications platform component can provide support for one or more communications platforms such as, but not limited to, Twilio, Vonage, Podium, Plivo, Telnyx, Zoom, Slack, Discord, Microsoft Teams, Skype, Google Messages, Facebook Messenger, and/or the like.

In preferred embodiments, the external communications support request routing system can employ a client communications service component to generate client support sessions to facilitate real-time communications between a client computing device and a support computing device depending on the external communications platform in which the client computing device uses to contact the support computing device. For this purpose, the client communications service component can parse a client support request to identify support routing data and determine, based on the support routing data, a designated external communications platform address associated with a designated external communications platform credential. The client communications service component can integrate with the configuration data store to obtain and/or validate an external communications platform credential comprised in the support routing data related to the external communications platform from which the client computing device initiates communication. For instance, the client communications service component can validate the designated external communications platform credential associated with the designated external communications platform address, where the designated external communications platform address comprises at least one of unique IP address, MAC address, API endpoint address, network component address, server system address, email address, phone number, or any other unique computer-readable address associated with a particular external communications platform.

Once the designated external communications platform credential and the designated external communications platform address have been validated, the client communications service component can generate a client support session to connect the client computing device to a support computing device such that real-time communications between the client computing device and the support computing device can be facilitated. The client support session facilitated by the client communications service component between the client computing device and the support computing device can include, but are not limited to, phone calls, video calls, SMS messaging channels, direct chat channels, email channels, and/or the like. The client communications service component can connect the client computing device to the support computing device based on an on-call support computing device schedule maintained by the on-call schedule data store, where the on-call support computing device schedule comprises an active list of support computing device(s) that are on-call, "live," and/or capable of connecting to a client computing device in real time.

Any data associated with the client support sessions facilitated by the client communications service component can be stored in a communications data store. The data associated with the client support sessions facilitated by the client communications service component can comprise any audio data, video data, chat transcription data, SMS transcription data, email transcription data, and/or the like, along with any corresponding timestamp data associated with the communications facilitated by the client communications service component. In various embodiments, an analytics service component can employ the data maintained in the communications data store to generate insight data related to the external communications support request routing system.

The analytics service component can employ an analytics engine and/or a recommendation engine to generate the insight data, where the insight data comprises system-wide usage statistics, support computing device statistics, and/or recommendations for enhancing and optimizing the external communications support request routing system to achieve various goals. For example, the insight data can comprise recommendations including, but not limited to, recommendations associated with improving the efficiency of the external communications support request routing system, optimizing costs imposed on the enterprise and/or the client, reducing operational redundancy in the external communications support request routing system, and/or increasing enterprise scalability.

In one or more embodiments, the insight data generated by the analytics service component can be configured for rendering to an interactive interface displayed by the support computing device such that an interaction with the interactive interface can cause the execution of one or more portions of executable program code related to employing the recommendations associated with the insight data in the user-defined external support request routing platform.

In various embodiments, the analytics service component can employ a predictive machine learning model in order to generate the insight data associated with the external communications support request routing system. In an exemplary external communications support request routing system, the associated predictive machine learning model can be iteratively updated such that the more the external communications support request routing system is employed, the more accurate the insight data becomes. For example, the more request record data harvested by the client communications service component and stored in the communications data store, and/or the more external communications platform integration data stored in the configuration data store, the larger the training data set for the predictive machine learning model will be. In this regard, improvements to computer efficiency, as well as the external communications support request routing system itself, are made by reducing the time and resources necessary to interpret and extrapolate actionable insights from the insight data. Furthermore, the time, human resources, and cognitive load necessary to generate recommendations and reconfigure the external communications support request routing system based on said recommendations are also reduced.

Definitions

"External communications support request routing system" refers to computer-coded instructions, executable code, a selected service of federated service architecture, and/or a software application that is configured for execution via one or more computing devices. The computing devices and the computing devices' associated components facilitate the configuration and management of a user-defined external support request routing platform. The external communications support request routing system is configured to receive support communications integration definition objects and, in response to receiving the support communications integration definition objects, update a support communications platform integration in a configuration data store. The external communications support request routing system receives and parses client support requests to identify support routing data and determines a designated external communications platform address and a designated external communications platform credential from the support communications platform integration based on the support routing data. Additionally, the external communications support request routing system can cause output of the client support requests to the designated external communications platform address. In preferred embodiments, the external communications support request routing system comprises at least one configuration data store, at least one communications data store, and at least one on-call schedules data store, and operates on one or more portions of executable code.

"Support communications integration definition object" refers to a structured, electronically managed data object generated via a support computing device integrated with an external communications support request routing system. A particular support communications integration definition object comprises respective data objects comprising metadata associated with an external communications platform type identifier, an external communications platform provider identifier, an external communications platform address, and an external communications platform credential. A support communications integration definition object is organized in a manner that makes it processable, storable, and/or otherwise interpretable by the one or more components of an external communications support request routing system. An external communications support request routing system can use the support communications integration definition object to update a support communications platform integration, thereby re-configuring the external communications support request routing system itself.

"External communications platform type identifier" refers to an electronically managed data object comprising metadata related to identifying information associated with an external communications platform's type. The external communications platform type identifier can be associated with one or more types of communication including, but not limited to, telephonic communication, SMS communication, video communication, email communication, group chat channel communication, direct chat communication, and/or the like.

"External communications platform provider identifier" refers to an electronically managed data object comprising metadata related to identifying information associated with an external communications platform provider. The external communications platform provider identifier can be associated with one or more external communications platform providers including, but not limited to, Twilio, Vonage, Podium, Plivo, Telnyx, Zoom, Slack, Discord, Microsoft Teams, Skype, Google Messages, Facebook Messenger, and/or the like.

"External communications platform address" refers to an electronically managed data object comprising metadata related to routing and address information associated with an external communications platform provider. The external communications platform address can be associated with metadata related to one or more types of computer-readable addresses such as source addresses, destination addresses, various networking endpoints, and/or phone numbers. For example, the external communications platform address can comprise, but is not limited to, IP address metadata, MAC address metadata, API endpoint metadata, network component address metadata (e.g., router, switcher, and/or networking bridge address metadata), server system address metadata, email address metadata, phone number metadata, and/or the like. In preferred embodiments, an external communications platform address can be defined by a user, company, and/or enterprise utilizing an external communications support request routing system associated with an exemplary user-defined external support request routing platform as described herein.

"External communications platform credential" refers to an electronically managed data object comprising metadata related to the identification, authentication, and/or authorization of a particular external communications platform provider in order to allow the particular external communications platform provider to interface with a particular external communications support request routing system. The external communications platform credential comprises a particular external communications platform provider identifier and an authentication key associated with the particular external communications platform provider identifier. In various embodiments, the external communications platform credential is associated with a particular external communications platform address. In various embodiments, the particular external communications platform address can serve as the authentication key associated with the particular external communications platform provider identifier. An external communications support request routing system can validate the external communications platform credential and/or the external communications platform address in order to output a client support request to the external communications platform address and initiate a client support session.

"External communications platform type set" refers to a structured, electronically managed data object comprising one or more external communications platform type identifiers associated with a support communications platform integration.

"External communications platform provider set" refers to a structured, electronically managed data object comprising one or more external communications platform provider identifiers associated with a support communications platform integration.

"External communications platform address set" refers to a structured, electronically managed data object comprising one or more external communications platform addresses associated with a support communications platform integration.

"External communications platform credential set" refers to a structured, electronically managed data object comprising one or more external communications platform credentials associated with a support communications platform integration.

"Support communications platform integration" refers to a collection of structured, electronically managed data objects associated with a particular configuration of a particular external communications support request routing system integrated with an alerting and incident management system (e.g., Opsgenie® by Atlassian®). The support communications platform integration comprises an external communications platform type set, an external communications platform provider set, an external communications platform address set, and an external communications platform credential set. The support communications platform integration can be configured and updated by an integration manager associated with the particular external communications support request routing system. In preferred embodiments, a user, company, and/or enterprise utilizing a user-defined external support request routing platform can employ the support communications platform integration to configure an external communications support request routing system. As such, the support communications platform integration can be used to define which external communications platforms a client computing device can use to communicate with a support computing device associated with the user, company, and/or enterprise. Data related to the support communications platform integration can be stored in a configuration data store associated with a particular external communications support request routing system.

"Client support request" refers to a request generated by a client computing device associated with a particular external communications platform to initiate communications with a particular user, company, and/or enterprise. The client support request is associated with a client of the particular user, company, and/or enterprise that is in need of assistance related to technical issues that are flagged by an alerting and incident management system monitoring the performance and execution of enterprise-level software applications and services. Additionally or alternatively, in various embodiments, the client support request can be a request for, but is not limited to, IT assistance, HR assistance, financial assistance, healthcare assistance, and/or assistance with a product or service offered by the particular user, company, and/or enterprise. The client support request comprises support routing data associated with a particular external communications platform address and a particular external communications platform credential maintained in the support communications platform integration associated with the external communications support request routing system related to the particular user, company, and/or enterprise.

"Support routing data" refers to any metadata related to the routing of the client support request and any subsequent communications between a client computing device and a support computing device. An external communications support request routing system can employ the support routing data to determine a designated external communications platform address and a designated external communications platform credential. The support routing data comprises metadata related to a particular external communications platform type identifier, a particular external communications platform provider identifier, a particular external communications platform address, and/or a particular external communications platform credential maintained in a particular support communications platform integration.

"Designated external communications platform address" refers to a particular external communications platform address maintained in a particular support communications platform integration identified by an external communications support request routing system based on support routing data comprised in a client support request.

"Designated external communications platform credential" refers to a particular external communications platform credential maintained in a particular support communications platform integration identified by an external communications support request routing system based on support routing data comprised in a client support request.

As used herein, the terms "data," "content," "digital content," "digital content object," "information," and similar terms may be used interchangeably to refer to data capable of being transmitted, received, and/or stored in accordance with examples of the present disclosure. Thus, use of any such terms should not be taken to limit the spirit and scope of examples of the present disclosure. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like (sometimes referred to herein as a "network"). Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

The term "circuitry" should be understood broadly to include hardware and, in some examples, software for configuring the hardware. With respect to components of the apparatus, the term "circuitry" as used herein should therefore be understood to include particular hardware configured to perform the functions associated with the particular circuitry as described herein. For example, in some examples, "circuitry" may include processing circuitry, storage media, network interfaces, input/output devices, and the like.

"Computing device" refers to any computer, processor, circuitry, and/or other executor of computer instructions that is embodied in hardware, software, firmware, and/or any combination thereof. Non-limiting examples of a computing device include a computer, a processor, an application-specific integrated circuit, a field-programmable gate array, a personal computer, a smart phone, a laptop, a fixed terminal, a server, a networking device, and a virtual machine.

"Client computing device" refers to a computing device associated with a person, company, or other organizational structure that controls one or more systems and is in need of assistance from one or more individuals and/or departments associated with a particular user-defined external support request routing platform. In some embodiments, a client computing device is associated with particular external communications platform credentials that define access to operations via a particular user-defined external support request routing platform.

"Support computing device" refers to a computing device associated with a person, company, or other organizational structure that controls one or more systems and is capable of offering assistance to one or more persons, companies, or organizational structures associated with a client computing device. In some embodiments, a support computing device can validate particular external communications platform credentials associated with the client computing device to authenticate access to operations via a particular user-defined external support request routing platform.

"Executable code" refers to a portion of computer program code stored in one or a plurality of locations that is executed and/or executable via one or more computing devices embodied in hardware, software, firmware, and/or any combination thereof. Executable code defines at least one particular operation to be executed by one or more computing devices. In some embodiments, a memory, storage, and/or other computing device includes and/or otherwise is structured to define any amount of executable code (e.g., a portion of executable code associated with a first operation and a portion of executable code associated with a second operation). Alternatively or additionally, in some embodiments, executable code is embodied by separate computing devices (e.g., a first data store embodying first portion of executable code and a second data store embodying a second portion executable code).

"Data store" refers to any type of non-transitory computer-readable storage medium. Non-limiting examples of a data store include hardware, software, firmware, and/or a combination thereof capable of storing, recording, updating, retrieving and/or deleting computer-readable data and information.

"Data attribute" refers to electronically managed data representing a variable or particular criteria or property having a particular value or status. The value may be statically fixed or dynamically assigned. In some embodiments, a data attribute embodies a particular property of a data object.

"Data value" refers to electronically managed data representing a particular value for a particular data attribute.

"Metadata" refers to a collection of one or more data attributes associated with a data object such as a support communications integration definition object.

Example Systems, Apparatuses, and Data Flows of the Disclosure

FIG. 1 illustrates an architecture of an exemplary user-defined external support request routing platform 100 in accordance with one or more embodiments of the present disclosure. The exemplary user-defined external support request routing platform 100 includes an external communications support request routing system 101 comprising an integration manager 102, an external communications platform component 104, a configuration data store 106, a client communications service component 108, an on-call schedule data store 110, an analytics service component 112, and a communications data store 114. In one or more embodiments, the external communications support request routing system 101 of an exemplary user-defined external support request routing platform 100 can integrate with, or be embodied by, one or more client computing device(s) 116 and/or one or more support computing device(s) 118.

In one or more embodiments, the one or more client computing device(s) 116 and the one or more support computing device(s) 118 include or are embodied by one or more computing device(s) such as a smartphone, tablet, personal computer, laptop, and/or the like. The one or more client computing device(s) 116 and the one or more support computing device(s) 118 may be configured to store, access, or maintain one or more components of the external communications support request routing system 101, for example via one or more processor(s), non-transitory storage device(s), and/or communications circuitry(s) of the one or more client computing device(s) 116 and the one or more support computing device(s) 118. In some embodiments, the one or more client computing device(s) 116 and the one or more support computing device(s) 118 include or are embodied in a single computing device or plurality of interacting computing devices. In other embodiments, the one or more client computing device(s) 116 and the one or more support computing device(s) 118 include a plurality of computing devices associated with a single user or a plurality of users, where a user can be a person, company, enterprise, and/or other organizational structure.

The external communications support request routing system 101 is configured to receive support communications integration definition objects and, in response to receiving the support communications integration definition objects, update a support communications platform integration in a configuration data store 106. The support communications platform integration configures how the external communications support request routing system 101 receives and parses client support requests to identify support routing data for determining a designated external communications platform address and a designated external communications platform credential for the client support request. Additionally, the external communications support request routing system 101 can cause output of the client support requests to the designated external communications platform address. In preferred embodiments, the external communications support request routing system 101 comprises at least one configuration data store 106, at least one communications data store 114, and at least one on-call schedule data store 110.

The integration manager 102 of the external communications support request routing system 101 is configured to receive a support communications integration definition object (e.g., support communications integration definition object 402), where the support communications integration definition object comprises one or more of an external communications platform type identifier, an external communications platform provider identifier, an external communications platform address, and an external communications platform credential. Based on the support communications integration definition object, the integration manager 102 can update a support communications platform integration associated with the external communications support request routing system 101. The integration manager 102 can store, add, remove, and/or update any data related support communications platform integration in the configuration data store 106 based on the support communications integration definition object. In preferred embodiments, the support communications platform integration stored in the configuration data store 106 comprises an external communications platform type set, an external communications platform provider set, an external communications platform address set, and an external communications platform credential set. As such, when the integration manager 102 makes one or more updates to the support communications platform integration, the one or more updates can comprise updating an external communications platform type set to include the external communications platform type identifier, updating an external communications platform provider set to include the external communications platform provider identifier, updating an external communications platform address set to include the external communications platform address, and/or updating an external communications platform credential set to include the external communications platform credential. In one or more embodiments, the support communications platform integration is the basis for the configuration of the external communications support request routing system 101 and any updates made to the support communications platform integration (e.g., such as by a support communications integration definition object generated by support computing device(s) 118) directly affect the functionality and execution of any computer program code associated with the external communications support request routing system 101.

The external communications platform component 104 of the external communications support request routing system 101 is configured to fetch metadata related to a plurality of external communications platforms. The integration manager 102 can direct the external communications platform component 104 to fetch said metadata based on a support communications integration definition object and store the metadata in the configuration data store 106. For example, the integration manager 102 can cause the external communications platform component 104 to fetch metadata associated with a plurality of external communications platforms such as, but not limited to, Twilio, Vonage, Podium, Plivo, Telnyx, Zoom, Slack, Discord, Microsoft Teams, Skype, Google Messages, Facebook Messenger, and/or the like based on the support communications integration definition object, and employ said metadata to update the support communications platform integration in the configuration data store 106.

Furthermore, the external communications platform component 104 is configured to integrate with one or more external communications platforms associated with the external communications support request routing system 101 (e.g., the one or more external communications platforms comprised in the support communications platform integration in the configuration data store 106). As such, the external communications platform component 104 is configured to receive client support requests initiated via the one or more external communications platforms associate with the external communications support request routing system 101 and route the client support requests to the client communications service component 108.

The client communications service component 108 of the external communications support request routing system 101 can facilitate communications between a client computing device 116 and a support computing device 118 based on the external communications platform in which the client computing device 116 uses to contact the support computing device 118. For this purpose, the client communications service component 108 can receive a client support request from the external communications platform component 104. The client support request is a request generated by the client computing device 116 and is associated with a particular external communications platform from which the client computing device 116 employs to initiate communications with a support computing device 118 associated with a particular external communications support request routing system 101. The client support request is associated with a client of a particular user, company, and/or enterprise associated with the particular external communications support request routing system 101 that is in need of assistance related to technical issues that are flagged by an alerting and incident management system monitoring the performance and execution of enterprise-level software applications and services. Additionally or alternatively, in various embodiments, the client support request can be a request for, but is not limited to, IT assistance, HR assistance, financial assistance, healthcare assistance, and/or assistance with a product or service offered by the particular user, company, and/or enterprise associated with the particular external communications support request routing system 101.

The client support request comprises support routing data associated with a particular external communications platform address and a particular external communications platform credential maintained in the support communications platform integration associated with the particular external communications support request routing system 101. The support routing data comprises any metadata related to the routing of the client support request and any subsequent communications between the client computing device 116 and a support computing device 118. For example, the support routing data comprises metadata related to a particular external communications platform type identifier, a particular external communications platform provider identifier, a particular external communications platform address, and/or a particular external communications platform credential maintained in a particular support communications platform integration.

The client communications service component 108 can parse the client support request to determine a designated external communications platform address associated with a designated external communications platform credential. In this regard, the client communications service component 108 can integrate with the configuration data store 106 to obtain and/or validate an external communications platform credential comprised in the support routing data related to the external communications platform from which the client computing device 116 initiates communication. For instance, the client communications service component 108 can validate the designated external communications platform credential associated with the designated external communications platform address, where the designated external communications platform address comprises at least one of unique IP address, MAC address, API endpoint address, network component address, server system address, email address, phone number, or any other unique computer-readable address associated with a particular external communications platform.

Once the designated external communications platform credential and the designated external communications platform address have been validated, the client communications service component 108 can generate a client support session and connect the client computing device 116 to a support computing device 118 such that real-time communications between the client computing device 116 and the support computing device 118 can be facilitated. The client support session facilitated by the client communications service component 108 between the client computing device 116 and the support computing device 118 can include, but is not limited to, phone calls, video calls, SMS messaging channels, direct chat channels, email channels, and/or the like. The client communications service component 108 can generate the client support session for the client computing device 116 and the support computing device 118 based on an on-call support computing device schedule maintained by the on-call schedule data store 110, where the on-call support computing device schedule comprises an active list of support computing device(s) that are on-call, "live," and/or capable of connecting to a client computing device in real time. The client communications service component 108 can harvest request record files comprising request record data associated with one or more client support sessions and store the request record data in the communications data store 114. The request record data associated with the one or more client support sessions facilitated by the client communications service component 108 can comprise any audio data, video data, chat transcription data, SMS transcription data, email transcription data, and/or the like, along with any corresponding timestamp data associated with the one or more client support sessions facilitated by the client communications service component 108.

The analytics service component 112 of the external communications support request routing system 101 can employ the request record data maintained in the communications data store 114 to generate insight data related to the external communications support request routing system 101. The analytics service component 112 can employ an analytics engine and/or a recommendation engine to generate the insight data, where the insight data comprises system-wide usage statistics and/or recommendations for enhancing and optimizing the external communications support request routing system 101 to achieve various goals. For example, the insight data can comprise recommendations including, but not limited to, recommendations associated with improving the efficiency of the external communications support request routing system 101, optimizing costs imposed on the enterprise and/or the client, reducing operational redundancy in the external communications support request routing system 101, and/or increasing enterprise scalability. In one or more embodiments, the insight data generated by the analytics service component can be configured on an interactive interface rendered by the support computing device such that an interaction with the interactive interface can cause the execution of one or more portions of executable program code related to employing the recommendations associated with the insight data in the user-defined external support request routing platform 100.

Additionally or alternatively, the analytics service component 112 can employ a predictive machine learning model in order to generate the insight data associated with the external communications support request routing system 101. In an exemplary external communications support request routing system 101, the associated predictive machine learning model can be iteratively updated such that the more the external communications support request routing system 101 is employed, the more accurate the insight data becomes. For example, the more request record data harvested by the client communications service component 108 and stored in the communications data store 114, and/or the more external communications platform integration data stored in the configuration data store 106, the larger the training data set for the predictive machine learning model will be. In this regard, improvements to computer efficiency, as well as the external communications support request routing system 101 itself, are made by reducing the time and resources necessary to interpret and extrapolate actionable insights from the insight data. Furthermore, the time, human resources, and cognitive load necessary to generate recommendations and reconfigure the external communications support request routing system 101 based on said recommendations are also reduced.

Figure 2:
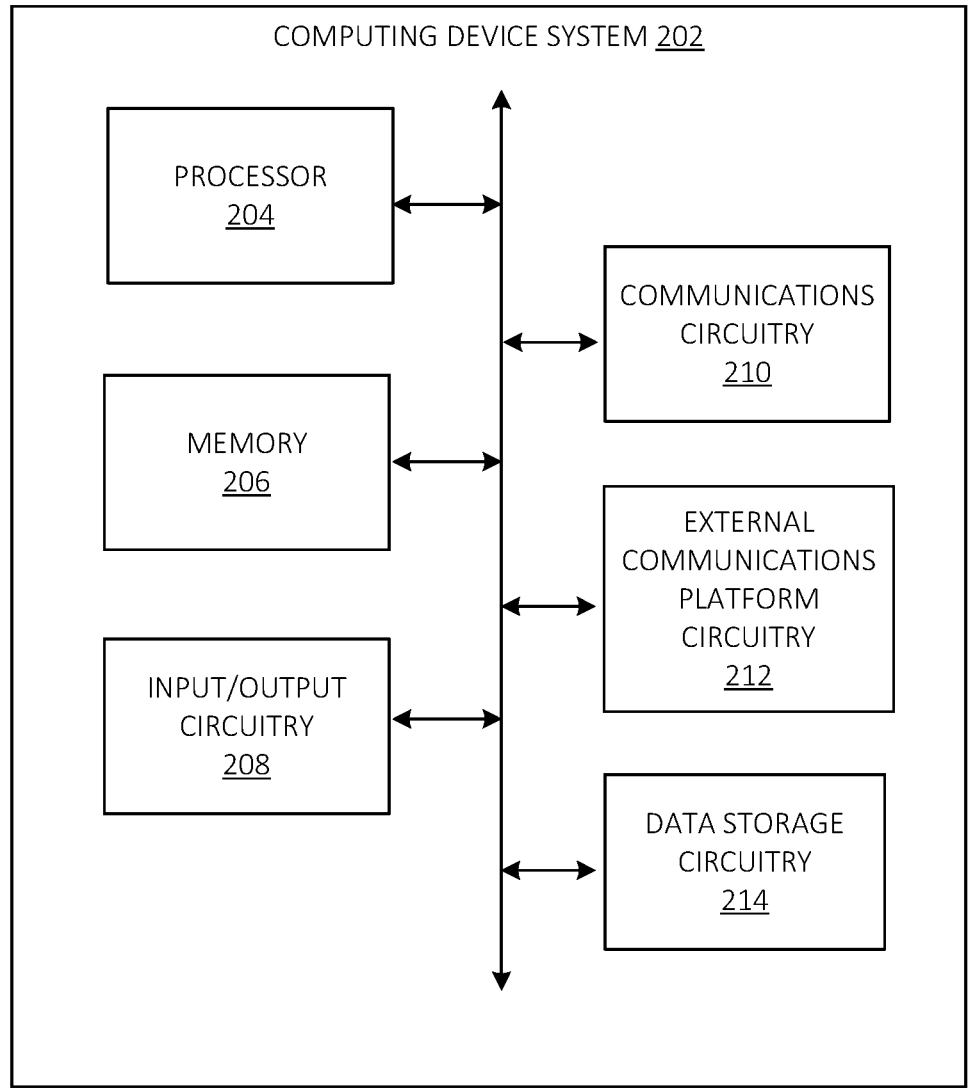
FIG. 2 is a block diagram of an exemplary computing device system structured in accordance with one or more embodiments of the present disclosure.

FIG. 2 illustrates a block diagram 200 of an example apparatus according to one or more described features of one or more embodiments of the disclosure. Specifically, the block diagram 200 includes a computing device system 202 to provide a practical application of routing a client support request in an exemplary user-defined external support request routing platform in accordance with at least some example embodiments of the present disclosure. In some embodiments, the external communications support request routing system 101 can be integrated with, or embodied by, one or more devices such as the computing device system 202 as depicted and described in FIG. 2. Additionally, in one or more embodiments, the computing device system 202 can be integrated with, or embodied by, a client computing device 116 and/or a support computing device 118.

The computing device system 202 includes processor 204, memory 206, input/output circuitry 208, communications circuitry 210, external communications platform circuitry 212, and/or data storage circuitry 214. In some embodiments, the computing device system 202 is configured, using one or more of the sets of circuitry 204, 206, 208, 210, 212, and/or 214, to execute and perform the operations described herein.

In general, the terms computing device, system, entity, and/or similar words used herein interchangeably may refer to, for example, one or more computers, computing entities, desktop computers, mobile phones, tablets, phablets, notebooks, laptops, distributed systems, items/devices, terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably. In this regard, the computing device system 202 embodies a particular, specially configured computing system transformed to enable the specific operations described herein and provide the specific advantages associated therewith, as described herein.

Although components are described with respect to functional limitations, it should be understood that the particular implementations necessarily include the use of particular computing hardware. It should also be understood that in some embodiments certain of the components described herein include similar or common hardware. For example, in some embodiments two sets of circuitry both leverage use of the same processor(s), network interface(s), storage medium(s), and/or the like, to perform their associated functions, such that duplicate hardware is not required for each set of circuitry. The use of the term "circuitry" as used herein with respect to components of the apparatuses described herein should therefore be understood to include particular hardware configured to perform the functions associated with the particular circuitry as described herein.

Particularly, the term "circuitry" should be understood broadly to include hardware and, in some embodiments, software for configuring the hardware. For example, in some embodiments, "circuitry" includes processing circuitry, storage media, network interfaces, input/output devices, and/or the like. Alternatively or additionally, in some embodiments, other elements of the computing device system 202 provide or supplement the functionality of another particular set of circuitry. For example, the processor 204 in some embodiments provides processing functionality to any of the sets of circuitry, the memory 206 provides storage functionality to any of the sets of circuitry, the communications circuitry 210 provides network interface functionality to any of the sets of circuitry, and/or the like.

In some embodiments, the processor 204 (and/or co-processor or any other processing circuitry assisting or otherwise associated with the processor) is/are in communication with the memory 206 via a bus for passing information among components of the computing device system 202. In some embodiments, for example, the memory 206 is non-transitory and may include, for example, one or more volatile and/or non-volatile memories. In other words, for example, the memory 206 in some embodiments includes or embodies an electronic storage device (e.g., a computer readable storage medium). In some embodiments, the memory 206 is configured to store information, data, content, applications, instructions, or the like, for enabling the apparatus 200 to carry out various functions in accordance with example embodiments of the present disclosure.

The processor 204 may be embodied in a number of different ways. For example, in some example embodiments, the processor 204 includes one or more processing devices configured to perform independently. Additionally or alternatively, in some embodiments, the processor 204 includes one or more processor(s) configured in tandem via a bus to enable independent execution of instructions, pipelining, and/or multithreading. The use of the terms "processor" and "processing circuitry" should be understood to include a single core processor, a multi-core processor, multiple processors internal to the computing device system 202, and/or one or more remote or "cloud" processor(s) external to the computing device system 202.

In an example embodiment, the processor 204 is configured to execute instructions stored in the memory 206 or otherwise accessible to the processor. Alternatively or additionally, the processor 204 in some embodiments is configured to execute hard-coded functionality. As such, whether configured by hardware or software methods, or by a combination thereof, the processor 204 represents an entity (e.g., physically embodied in circuitry) capable of performing operations according to an embodiment of the present disclosure while configured accordingly. Alternatively or additionally, as another example in some example embodiments, when the processor 204 is embodied as an executor of software instructions, the instructions specifically configure the processor 204 to perform the algorithms embodied in the specific operations described herein when such instructions are executed. As one particular example embodiment, the processor 204 is configured to perform various operations associated with routing a client support request in an external communications support request routing system 101. In some embodiments, the processor 204 includes hardware, software, firmware, and/or a combination thereof, that generates, stores, and/or maintains a support communications platform integration for a particular external communications support request routing system 101. Additionally or alternatively the processor 204 includes hardware, software, firmware, and/or a combination thereof, that generates insight data related to the operations of an external communications support request routing system 101.

The computing device system 202 includes input/output circuitry 208 that provides output to a client computing device 116 and/or a support computing device 118 and, in some embodiments, receives an indication of a user input from a respective computing device. In some embodiments, the input/output circuitry 208 is in communication with the processor 204 to provide such functionality. The input/output circuitry 208 may comprise one or more user interface(s) and in some embodiments includes a display that comprises the interface(s) rendered as a web user interface, an application user interface, a user device, a backend system, or the like. In some embodiments, the input/output circuitry 208 also includes a keyboard, a mouse, a joystick, a touch screen, touch areas, soft keys a microphone, a speaker, or other input/output mechanisms. The processor 204 and/or input/output circuitry 208 comprising the processor may be configured to control one or more functions of one or more user interface elements through computer program instructions (e.g., software and/or firmware) stored on a memory accessible to the processor (e.g., memory 206, and/or the like). In some embodiments, the input/output circuitry 208 includes or utilizes a user-facing application to provide input/output functionality to a client computing device 116, a support computing device 118, and/or other display associated with a user.

The computing device system 202 also includes communications circuitry 210. The communications circuitry 210 includes any means such as a device or circuitry embodied in either hardware or a combination of hardware and software that is configured to receive and/or transmit data from/to a network and/or any other device, circuitry, or module in communication with the computing device system 202. In this regard, in some embodiments the communications circuitry 210 includes, for example, a network interface for enabling communications with a wired or wireless communications network (e.g., network 302). Additionally or alternatively in some embodiments, the communications circuitry 210 includes one or more network interface card(s), antenna(s), bus(es), switch(es), router(s), modem(s), and supporting hardware, firmware, and/or software, or any other device suitable for enabling communications via one or more communications network(s). Additionally or alternatively, the communications circuitry 210 includes circuitry for interacting with the antenna(s) and/or other hardware or software to cause transmission of signals via the antenna(s) or to handle receipt of signals received via the antenna(s). In some embodiments, the communications circuitry 210 enables transmission to and/or receipt of data from various components of an external communications support request routing system 101 and/or another external device in communication with the computing device system 202.

The external communications platform circuitry 212 includes hardware, software, firmware, and/or a combination thereof, that supports operation(s) facilitated in whole or in part via interaction with an external communications platform associated with an external communications support request routing system 101. In some embodiments, the external communications platform circuitry 212 includes hardware, software, firmware, and/or any combination thereof, that processes request(s) to perform operations associated with receiving a client support request, fetching metadata related to one or more external communications platforms associated with the external communications support request routing system 101, interfacing with one or more external communications platforms associated with the external communications support request routing system 101, and/or facilitating a client support session. In some embodiments, the external communications platform circuitry 212 includes a separate processor, specially configured field programmable gate array (FPGA), or a specially programmed application specific integrated circuit (ASIC).

The data storage circuitry 214 includes hardware, software, firmware, and/or a combination thereof, that supports functionality for generating, storing, and/or maintaining one or more data objects associated with the external communications support request routing system 101. For example, in some embodiments, the data storage circuitry 214 includes hardware, software, firmware, and/or a combination thereof, that stores data related to a support communications platform integration associated with the external communications support request routing system 101 in the configuration data store 106. The data storage circuitry 214 also stores and maintains one or more on-call support device schedules stored in the on-call schedule data store 110. The data storage circuitry 214 also stores and maintains request record data (e.g., request record data 412) associated with one or more request record files harvested by the client communications service component 108 and stored in the communications data store 114. In some embodiments, the data storage circuitry 214 can be integrated with, or embodied by, the configuration data store 106, the on-call schedule data store 110, and/or the communications data store 114. In some embodiments, the data storage circuitry 214 includes a separate processor, specially configured field programmable gate array (FPGA), or a specially programmed application specific integrated circuit (ASIC).

Additionally or alternatively, in some embodiments, two or more of the sets of circuitries 204-214 are combinable. Additionally or alternatively, in some embodiments, one or more of the sets of circuitry perform some or all of the functionality described associated with another component. For example, in some embodiments, two or more of the sets of circuitry 204-214 are combined into a single module embodied in hardware, software, firmware, and/or a combination thereof. Similarly, in some embodiments, one or more of the sets of circuitry, for example the communications circuitry 210, the communications platform circuitry 212 and/or the data storage circuitry 214 is/are combined with the processor 204, such that the processor 204 performs one or more of the operations described above with respect to each of these sets of circuitry 210-214.

Figure 3:
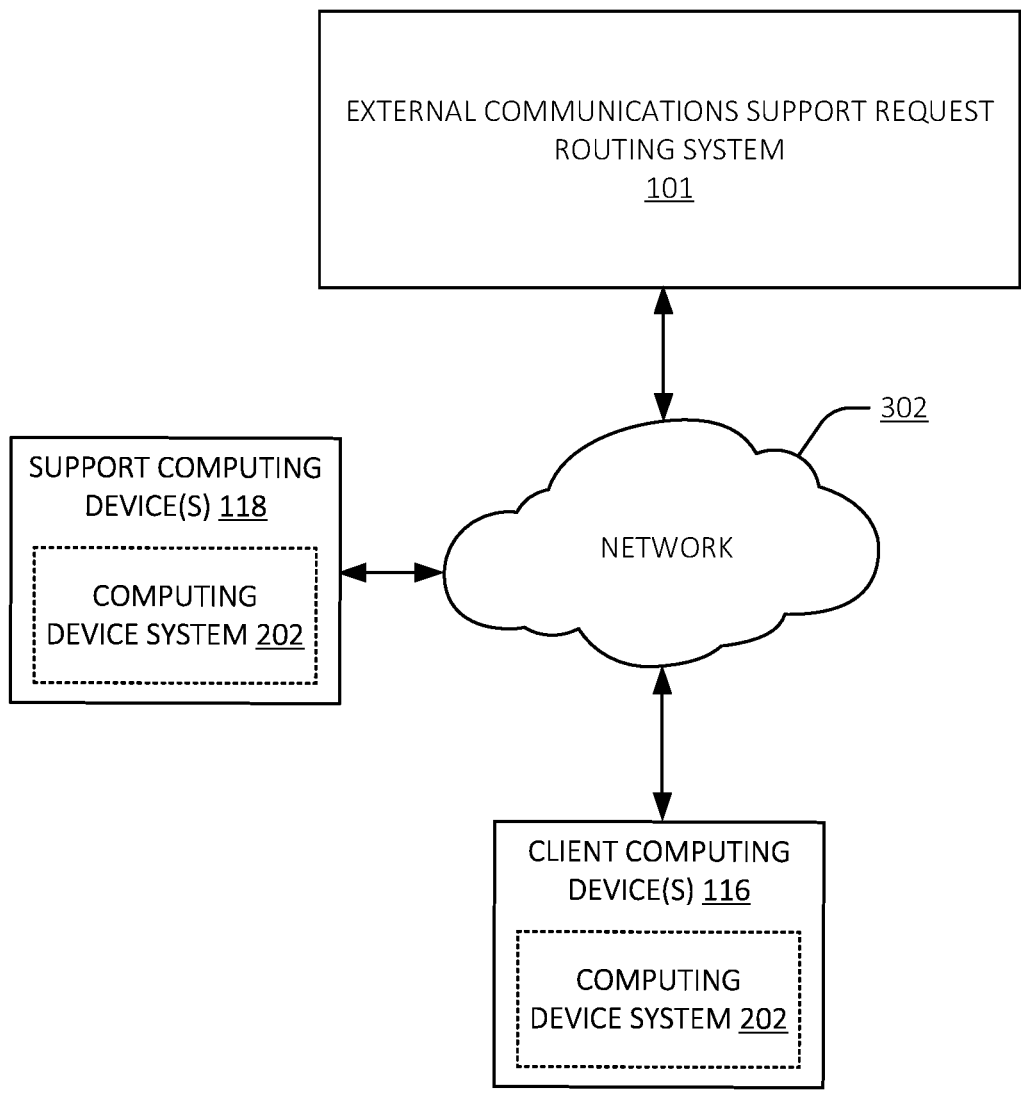
FIG. 3 illustrates a system that provides an exemplary networked computing system environment associated with a user-defined external support request routing platform in accordance with one or more embodiments of the present disclosure.

FIG. 3 illustrates a system that provides an exemplary networked computing system environment 300 associated with a user-defined external support request routing platform in accordance with one or more embodiments of the present disclosure. Specifically, FIG. 3 illustrates how one or more support computing device(s) 118 and one or more client computing device(s) 116 can integrate with an exemplary external communications support request routing system 101 via a network 302. In various embodiments, the one or more support computing device(s) 118 and the one or more client computing device(s) 116 comprise a computing device system 202 with which to facilitate the integration of the one or more support computing device(s) 118 and the one or more client computing device(s) 116 with the external communications support request routing system 101.

In various embodiments, network 302 is any suitable network or combination of networks and supports any appropriate protocol suitable for communication of data to and from components of the external communications support request routing system 101 and various other components in the networked computing system environment 300 (e.g., components of the one or more support computing device(s) 118 and the one or more client computing device(s) 116). According to various embodiments, network 302 includes a public network (e.g., the Internet), a private network (e.g., a network within an organization), or a combination of public and/or private networks. According to various embodiments, network 302 is configured to provide communication between various components depicted in FIG. 1 and FIG. 4. According to various embodiments, network 302 comprises one or more networks that connect devices and/or components in the network layout to allow communication between the devices and/or components. For example, the network 302 can be implemented as the Internet, a wireless network, a wired network (e.g., Ethernet), a local area network (LAN), a Wide Area Network (WANs), Bluetooth, Near Field Communication (NFC), Worldwide Interoperability for Microwave Access (WiMAX) network, a personal area network (PAN), a short-range wireless network (e.g., a Bluetooth® network), an infrared wireless (e.g., IrDA) network, an ultra-wideband (UWB) network, an induction wireless transmission network, and/or any other type of network that provides communications between one or more components of the network layout. In some embodiments, network 302 is implemented using cellular networks, satellite, licensed radio, or a combination of cellular, satellite, licensed radio, and/or unlicensed radio networks.

In one or more embodiments, the communications circuitry 210, the external communications platform circuitry 212 (and/or a combination thereof) comprised in the computing device system(s) 202 embodied by the one or more support computing device(s) 118 and the one or more client computing device(s) 116 can transmit and receive data objects to and from the external communications support request routing system 101 via the network 302. For example, an integration manager (e.g., integration manager 102) of the external communications support request routing system 101 can receive a support communications integration definition object generated by a support computing device 118 via the network 302. Likewise, an external communications platform component (e.g., an external communications platform component 104) of the external communications support request routing system 101 can receive a client support request generated by a client computing device 116 via the network 302. Furthermore, a client support session generated by a client communications service component (e.g., client communications service component 108) in which a support computing device 118 and a client computing device 116 can communicate in real time (e.g., such as by a phone, video, SMS, direct chat, and/or email service provided by an external communications platform integrated with the external communications support request routing system 101) can be facilitated over the network 302.

In preferred embodiments, the integration manager (e.g., integration manager 102), the external communications platform component (e.g., external communications platform component 104), and/or the client communications service component (e.g., client communications service component 108) of the external communications support request routing system 101 incorporate encryption capabilities to facilitate encryption and/or decryption of one or more portions of data related to a support communications platform integration, a client support request, one or more client support sessions, and any data comprised in a configuration data store (e.g., configuration data store 106), an on-call schedule data store (e.g. on-call schedule data store 110) and/or a communications data store (e.g., communications data store 114) associated with the external communications support request routing system 101.

Figure 4:
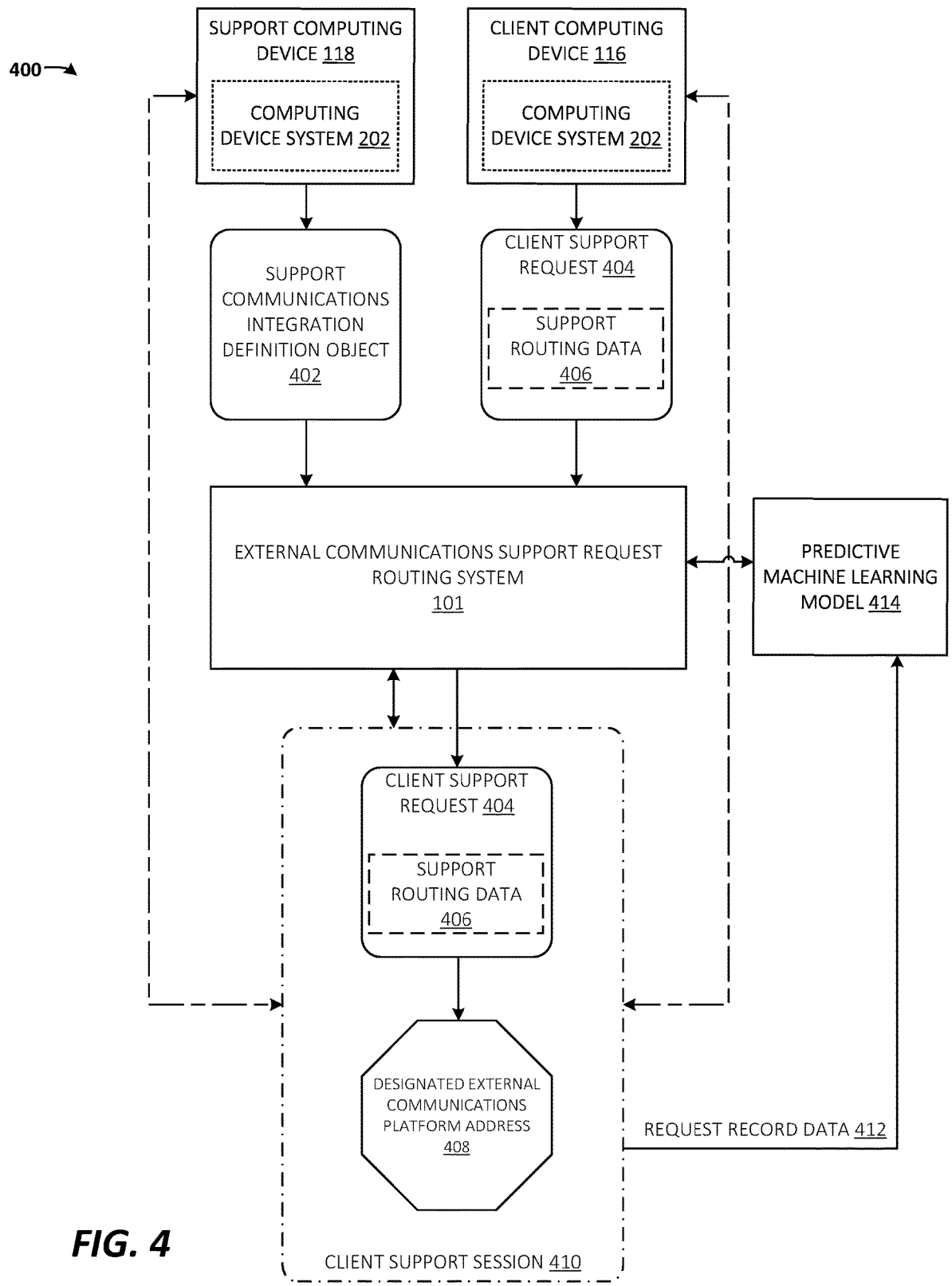
FIG. 4 is a block diagram illustrating data interactions within an exemplary user-defined external support request routing platform architecture in accordance with one or more embodiments of the present disclosure.

FIG. 4 is a block diagram illustrating data interactions within an exemplary user-defined external support request routing platform architecture 400 in accordance with one or more embodiments of the present disclosure. Specifically, FIG. 4 illustrates various data interactions and data flows between a support computing device 118, a client computing device 116, and an external communications support request routing system 101. In various embodiments the support computing device 118 and the client computing device 116 embody a computing device system 202 comprising one or more circuitries configured to facilitate the transmittal and reception of data objects to and from the external communications support request routing system 101 (e.g., the support communications integration definition object 402), as well as the components necessary to engage in a client support session (e.g., client support session 410). For example, the support computing device 118 can generate the support communications integration definition object 402 via the processor 204 of the embodied computing device system 202 and transmit the support communications integration definition object 402 to the external communications support request routing system 101 over the network 302 via the communications circuitry 210.

The external communications support request routing system 101 can receive a support communications integration definition object 402 from a support computing device 118. In preferred embodiments, the support communications integration definition object 402 comprises metadata that an integration manager (e.g., integration manager 102) can employ to update a support communications platform integration. The support communications platform integration is used to configure the external communications support request routing system 101 to facilitate the routing of client support requests for a particular enterprise employing an exemplary embodiment of a user-defined external support request routing platform. The support communications integration definition object 402 comprises respective data objects comprising metadata associated with one or more external communications platforms including, but not limited to: an external communications platform type identifier, an external communications platform provider identifier, an external communications platform address, and an external communications platform credential.

The external communications platform type identifier is a data object comprising metadata related to identifying information associated with an external communications platform's type. The external communications platform type identifier can be associated with one or more types of communication including, but not limited to, telephonic communication, VOIP communication, SMS communication, video communication, email communication, group chat channel communication, direct chat communication, and/or the like. The external communications platform provider identifier is a data object comprising metadata related to identifying information associated with an external communications platform provider. The external communications platform provider identifier can be associated with one or more external communications platform providers including, but not limited to, Twilio, Vonage, Podium, Plivo, Telnyx, Zoom, Slack, Discord, Microsoft Teams, Skype, Google Messages, Facebook Messenger, and/or the like.

The external communications platform address (e.g., designated external communications platform address 408) is data object comprising metadata related to routing and address information associated with an external communications platform provider. The external communications platform address can be associated with metadata related to one or more types of computer-readable addresses such as source addresses, destination addresses, various networking endpoints, and/or phone numbers. For example, the external communications platform address can comprise, but is not limited to, IP address metadata, MAC address metadata, API endpoint metadata, network component address metadata (e.g., router, switcher, and/or networking bridge address metadata), server system address metadata, email address metadata, phone number metadata, and/or the like. In preferred embodiments, an external communications platform address (e.g., designated external communications platform address 408) can be defined by a user, company, and/or enterprise utilizing an external communications support request routing system associated with an exemplary user-defined external support request routing platform as described herein.

The external communications platform credential is a data object comprising metadata related to the identification, authentication, and/or authorization of a particular external communications platform provider in order to allow the particular external communications platform provider to interface with the external communications support request routing system 101. The external communications platform credential comprises a particular external communications platform provider identifier and an authentication key associated with the particular external communications platform provider identifier. In various embodiments, the external communications platform credential is associated with a particular external communications platform address (e.g., designated external communications platform address 408). In various embodiments, the particular external communications platform address can serve as the authentication key associated with the particular external communications platform provider identifier. The client communications service component 108 of the external communications support request routing system 101 can validate the external communications platform credential and/or the external communications platform address in order to output a client support request to a designated external communications platform address (e.g., designated external communications platform address 408) and initiate a client support session 410.

In preferred embodiments, the external communications support request routing system 101 can use the respective data objects comprised in the support communications integration definition object 402 to update a support communications platform integration associated with the external communications support request routing system 101. As such, the external communications support request routing system 101 can be reconfigured to integrate with any desired external communications platform.

The external communications support request routing system 101 can also receive a client support request 404 generated by the client computing device 116. The client support request 404 is a request generated by a client computing device 116 associated with a particular external communications platform to initiate communications with a particular user, company, and/or enterprise associated with the external communications support request routing system 101. The client support request 404 is associated with a client of the particular user, company, and/or enterprise that is in need of assistance related to technical issues that are flagged by an alerting and incident management system monitoring the performance and execution of enterprise-level software applications and services. Additionally or alternatively, in various embodiments, the client support request can be a request for, but is not limited to, IT assistance, HR assistance, financial assistance, healthcare assistance, and/or assistance with a product or service offered by the particular user, company, and/or enterprise associated with the particular external communications support request routing system 101. The client support request 404 comprises support routing data 406 associated with a particular external communications platform address (e.g., designated external communications platform address 408) and a particular external communications platform credential maintained in the support communications platform integration associated with the external communications support request routing system 101 related to the particular user, company, and/or enterprise.

The support routing data 406 refers to any metadata related to the routing of the client support request 404 and any subsequent communications between the client computing device 116 and the support computing device 118. The external communications support request routing system 101 can employ the support routing data 406 to determine a designated external communications platform address (e.g., designated external communications platform address 408) and a designated external communications platform credential. The support routing data 406 comprises metadata related to a particular external communications platform type identifier, a particular external communications platform provider identifier, a particular external communications platform address, and/or a particular external communications platform credential maintained in the support communications platform integration of the external communications support request routing system 101.

The client communications service component 108 of the external communications support request routing system 101 can parse the client support request 404 and support routing data 406 to determine a designated external communications platform address (e.g., designated external communications platform address 408) associated with a designated external communications platform credential. In this regard, the client communications service component 108 of the external communications support request routing system 101 can integrate with the configuration data store 106 to obtain and/or validate an external communications platform credential comprised in the support routing data 406 related to the external communications platform from which the client computing device 116 initiates communication. For instance, the client communications service component 108 can validate the designated external communications platform credential associated with the designated external communications platform address 408, where the designated external communications platform address comprises at least one of unique IP address, MAC address, API endpoint address, network component address, server system address, email address, phone number, or any other unique computer-readable address associated with a particular external communications platform.

Once the designated external communications platform credential and the designated external communications platform address (e.g., designated external communications platform address 408) have been validated, the external communications support request routing system 101 can output the client support request 404 to the designated external communications platform address 408. As such, the external communications support request routing system 101 can generate a client support session 410 and connect the client computing device 116 to a support computing device 118 such that real-time communications between the client computing device 116 and the support computing device 118 can be facilitated. The client support session 410 facilitated by the external communications support request routing system 101 between the client computing device 116 and the support computing device 118 can include, but is not limited to, phone calls, video calls, SMS messaging channels, direct chat channels, email channels, and/or the like. In various embodiments, the external communications support request routing system 101 can generate the client support session for the client computing device 116 and the support computing device 118 based on an on-call support computing device schedule maintained by the on-call schedule data store 110, where the on-call support computing device schedule comprises an active list of support computing device(s) that are on-call, "live," and/or capable of connecting to a client computing device in real time.

The client communications service component 108 of the external communications support request routing system 101 can harvest request record files comprising request record data (e.g., request record data 412) associated with one or more client support session(s) 410 and store the request record data in a communications data store (e.g., communications data store 114). The request record data 412 is associated with the one or more client support session(s) 410 facilitated by the external communications support request routing system 101 and can comprise any audio data, video data, chat transcription data, SMS transcription data, email transcription data, and/or the like, along with any corresponding timestamp data associated with the one or more client support session(s) 410 facilitated by the external communications support request routing system 101.

In various embodiments, the request record data 412 can be employed as a training data set by a predictive machine learning model 414 in order to generate insight data associated with the external communications support request routing system 101. Additionally or alternatively, any data comprised in the configuration data store 106, the on-call schedule data store 110, and/or the communications data store 114 of the external communications support request routing system 101 can also be employed by the predictive machine learning model 414 as training data.

The insight data generated by the predictive machine learning model 414 comprises system-wide usage statistics and/or recommendations for enhancing and optimizing the external communications support request routing system 101 to achieve various goals. For example, the insight data can comprise recommendations including, but not limited to, recommendations associated with improving the efficiency of the external communications support request routing system 101, optimizing costs imposed on the enterprise and/or the client, reducing operational redundancy in the external communications support request routing system 101, and/or increasing enterprise scalability. In one or more embodiments, the insight data generated by the predictive machine learning model 414 can be configured on an interactive interface rendered by the support computing device 118 such that an interaction with the interactive interface can cause the execution of one or more portions of executable program code related to employing the recommendations associated with the insight data in the external communications support request routing system 101. For example, employing one or more of the recommendations comprised in the insight data may cause an update to the one or more components and/or to the support communications platform integration, thereby re-configuring the external communications support request routing system 101 for optimal performance and efficiency.

In an exemplary external communications support request routing system 101, the associated predictive machine learning model 414 can be iteratively updated such that the more the external communications support request routing system 101 is employed, the more accurate the insight data becomes. For example, the more request record data harvested by the external communications support request routing system 101 (e.g., request record data 412) and stored in a communications data store (e.g., communications data store 114), and/or the more external communications platform integration data stored in a configuration data store (e.g., configuration data store 106), the larger the training data set for the predictive machine learning model 414 will be. In this regard, improvements to computer efficiency, as well as the external communications support request routing system 101 itself, are made by reducing the time and resources necessary to interpret and extrapolate actionable insights from the insight data.

In various embodiments, external communications support request routing system 101 can automatically apply the recommendations comprised in the insight data generated by the predictive machine learning model 414 such that updates to the to the support communications platform integration and/or the respective components comprised in the external communications support request routing system 101 can be made without a user interaction or confirmation. In this regard, the time, human resources, and cognitive load necessary to generate recommendations and reconfigure the external communications support request routing system 101 based on said recommendations are reduced.

Example Processes of the Disclosure

Having described example systems and apparatuses, data environments, data flows, and data architectures in accordance with the disclosure, example processes of the disclosure will now be discussed. It will be appreciated that each of the flowcharts depicts an example computer-implemented process that is performable by one or more of the apparatuses, systems, devices, and/or computer program products described herein, for example utilizing one or more of the specially configured components thereof.

The blocks indicate operations of each process. Such operations may be performed in any of a number of ways, including, without limitation, in the order and manner as depicted and described herein. In some embodiments, one or more blocks of any of the processes described herein occur in-between one or more blocks of another process, before one or more blocks of another process, in parallel with one or more blocks of another process, and/or as a sub-process of a second process. Similarly, it should be appreciated that one or more of the operations of each flowchart may be combinable, replaceable, and/or otherwise altered as described herein.

FIG. 5 illustrates a flowchart representing a process 500 for configuring an external communications support request routing system and routing a client support request in accordance with one or more embodiments of the present disclosure. In some embodiments, the process 500 is embodied by computer program code stored on a non-transitory computer-readable storage medium of a computer program product configured for execution to perform the process as depicted and described. Additionally or alternatively, in some embodiments, the process 500 is performed by one or more specially configured computing device systems such as the computing device system 202 alone or in communication with one or more other component(s), device(s), and/or system(s) (e.g., external communications support request routing system 101). In this regard, in some such embodiments, the computing device system 202 is specially configured by computer-coded instructions (e.g., computer program instructions) stored thereon, for example in the memory 206 and/or another component depicted and/or described herein and/or otherwise accessible to the computing device system 202, for performing the operations as depicted and described. In some embodiments, the computing device system 202 is embodied by, or in communication with, one or more external apparatus(es), system(s), device(s), and/or the like, to perform one or more of the operations as depicted and described. For example, in some embodiments, the computing device system 202 is embodied by a client computing device 116 and/or a support computing device 118 that is in communication with one or more system(s) integrated with, or embodying, a user-defined external support request routing platform (e.g., computing device system 202 embodied by support computing device 118 and integrated with external communications support request routing system 101). For purposes of simplifying the description, the process 500 is described as performed by and from the perspective of the computing device system 202.

The process 500 begins at operation 502. At operation 502, the computing device system 202 includes means, such as the processor 204, memory 206, input/output circuitry 208, communications circuitry 210, external communications platform circuitry 212, and/or data storage circuitry 214, or any combination thereof, that receives, via an external communications support request routing system, a support communications integration definition object comprising an external communications platform type identifier, an external communications platform provider identifier, an external communications platform address, and an external communications platform credential. For example, the support computing device 118 can generate the support communications integration definition object 402 and transmit it to the external communications support request routing system 101. Additionally or alternatively, the support communications integration definition object can be transmitted to the external communications support request routing system 101 remotely, for example, by the communications circuitry 210 of one or more user computing device system(s) 202.

At operation 504, the computing device system 202 includes means, such as the processor 204, memory 206, input/output circuitry 208, communications circuitry 210, external communications platform circuitry 212, and/or data storage circuitry 214, or any combination thereof, that updates a support communications platform integration in a configuration data store in response to receiving the support communications integration definition object. For example, based on the received support communications integration definition object (e.g., support communications integration definition object 402), an integration manager (e.g., integration manager 102) can update a support communications platform integration associated with the external communications support request routing system 101. The integration manager 102 can store, add, remove, and/or update any data related support communications platform integration in a configuration data store (e.g., configuration data store 106) based on the support communications integration definition object 402. In preferred embodiments, the support communications platform integration stored in the configuration data store 106 comprises an external communications platform type set, an external communications platform provider set, an external communications platform address set, and an external communications platform credential set. Operation 504 also includes optional operations 504A-504D which perform various updates to the support communications platform integration associated with the external communications support request routing system 101 based on the metadata comprised in the support communications integration definition object 402.

At optional operation 504A, the computing device system 202 includes means, such as the processor 204, memory 206, input/output circuitry 208, communications circuitry 210, external communications platform circuitry 212, and/or data storage circuitry 214, or any combination thereof, that updates the external communications platform type set to include the external communications platform type identifier.

At optional operation 504B, the computing device system 202 includes means, such as the processor 204, memory 206, input/output circuitry 208, communications circuitry 210, external communications platform circuitry 212, and/or data storage circuitry 214, or any combination thereof, that updates the external communications platform provider set to include the external communications platform provider identifier.

At optional operation 504C, the computing device system 202 includes means, such as the processor 204, memory 206, input/output circuitry 208, communications circuitry 210, external communications platform circuitry 212, and/or data storage circuitry 214, or any combination thereof, that updates the external communications platform address set to include the external communications platform address.

At optional operation 504D, the computing device system 202 includes means, such as the processor 204, memory 206, input/output circuitry 208, communications circuitry 210, external communications platform circuitry 212, and/or data storage circuitry 214, or any combination thereof, that updates the external communications platform credential set to include the external communications platform credential.

At operation 506, the computing device system 202 includes means, such as the processor 204, memory 206, input/output circuitry 208, communications circuitry 210, external communications platform circuitry 212, and/or data storage circuitry 214, or any combination thereof, that parses a client support request to identify support routing data. For example, the external communications support request routing system 101 can receive a client support request (e.g., client support request 404) generated by the client computing device 116. The client support request 404 is a request generated by a client computing device 116 associated with a particular external communications platform to initiate communications with a particular user, company, and/or enterprise associated with the external communications support request routing system 101. The client support request 404 is associated with a client of the particular user, company, and/or enterprise that is in need of assistance related to technical issues that are flagged by an alerting and incident management system monitoring the performance and execution of enterprise-level software applications and services. Additionally or alternatively, in various embodiments, the client support request can be a request for, but is not limited to, IT assistance, HR assistance, financial assistance, healthcare assistance, and/or assistance with a product or service offered by the particular user, company, and/or enterprise associated with the particular external communications support request routing system 101. The client support request 404 comprises support routing data (e.g., support routing data 406) associated with a particular external communications platform address (e.g., designated external communications platform address 408) and a particular external communications platform credential maintained in the support communications platform integration associated with the external communications support request routing system 101 related to the particular user, company, and/or enterprise.

At operation 508, the computing device system 202 includes means, such as the processor 204, memory 206, input/output circuitry 208, communications circuitry 210, external communications platform circuitry 212, and/or data storage circuitry 214, or any combination thereof, that determines a designated external communications platform address and a designated external communications platform credential from the support communications platform integration based on the support routing data. For example, the support routing data 406 refers to any metadata related to the routing of the client support request 404 and any subsequent communications between the client computing device 116 and the support computing device 118. The external communications support request routing system 101 can employ the support routing data 406 to determine a designated external communications platform address (e.g., designated external communications platform address 408) and a designated external communications platform credential. The support routing data 406 comprises metadata related to a particular external communications platform type identifier, a particular external communications platform provider identifier, a particular external communications platform address, and/or a particular external communications platform credential maintained in the support communications platform integration of the external communications support request routing system 101.

The client communications service component 108 of the external communications support request routing system 101 can parse the client support request 404 and support routing data 406 to determine a designated external communications platform address (e.g., designated external communications platform address 408) associated with a designated external communications platform credential. In this regard, the client communications service component 108 of the external communications support request routing system 101 can integrate with the configuration data store 106 to obtain and/or validate an external communications platform credential comprised in the support routing data 406 related to the external communications platform from which the client computing device 116 initiates communication. For instance, the client communications service component 108 can validate the designated external communications platform credential associated with the designated external communications platform address 408, where the designated external communications platform address comprises at least one of unique IP address, MAC address, API endpoint address, network component address, server system address, email address, phone number, or any other unique computer-readable address associated with a particular external communications platform.

At operation 510, the computing device system 202 includes means, such as the processor 204, memory 206, input/output circuitry 208, communications circuitry 210, external communications platform circuitry 212, and/or data storage circuitry 214, or any combination thereof, that causes output of the client support request to the designated external communications platform address. For example, once the designated external communications platform credential and the designated external communications platform address (e.g., designated external communications platform address 408) have been validated, the external communications support request routing system 101 can output the client support request 404 to the designated external communications platform address 408. As such, the external communications support request routing system 101 can generate a client support session (e.g., client support session 410) and connect the client computing device 116 to a support computing device 118 such that real-time communications between the client computing device 116 and the support computing device 118 can be facilitated. The client support session 410 facilitated by the external communications support request routing system 101 between the client computing device 116 and the support computing device 118 can include, but is not limited to, phone calls, video calls, SMS messaging channels, direct chat channels, email channels, and/or the like. In various embodiments, the external communications support request routing system 101 can generate the client support session for the client computing device 116 and the support computing device 118 based on an on-call support computing device schedule maintained by the on-call schedule data store 110, where the on-call support computing device schedule comprises an active list of support computing device(s) that are on-call, "live," and/or capable of connecting to a client computing device in real time.

FIG. 6 illustrates a flowchart representing a process 600 for configuring an external communications support request routing system and routing a client support request in accordance with one or more embodiments of the present disclosure. In some embodiments, the process 600 is embodied by computer program code stored on a non-transitory computer-readable storage medium of a computer program product configured for execution to perform the process as depicted and described. Additionally or alternatively, in some embodiments, the process 600 is performed by one or more specially configured computing device systems such as the computing device system 202 alone or in communication with one or more other component(s), device(s), and/or system(s) (e.g., external communications support request routing system 101). In this regard, in some such embodiments, the computing device system 202 is specially configured by computer-coded instructions (e.g., computer program instructions) stored thereon, for example in the memory 206 and/or another component depicted and/or described herein and/or otherwise accessible to the computing device system 202, for performing the operations as depicted and described. In some embodiments, the computing device system 202 is embodied by, or in communication with, one or more external apparatus(es), system(s), device(s), and/or the like, to perform one or more of the operations as depicted and described. For example, in some embodiments, the computing device system 202 is embodied by a client computing device 116 and/or a support computing device 118 that is in communication with one or more system(s) integrated with, or embodying, a user-defined external support request routing platform (e.g., computing device system 202 embodied by support computing device 118 and integrated with external communications support request routing system 101). For purposes of simplifying the description, the process 600 is described as performed by and from the perspective of the computing device system 202.

The process 600 begins at operation 602. In some embodiments, the process 600 begins after one or more operations depicted and/or described with respect to any one of the other processes described herein. For example, in some embodiments as depicted, the process 600 begins before execution of operation 502. In this regard, some or all of the process 600 may replace or supplement one or more blocks depicted and/or described with respect to any of the processes described herein. Upon completion of the process 600, the flow of operations may terminate. Additionally or alternatively, as depicted, upon completion of the process 600 in some embodiments, flow may return to one or more operation(s) of another process, such as the operation 502. It will be appreciated that, in some embodiments, the process 600 embodies a sub-process of one or more other process(es) depicted and/or described herein, for example the process 500.

At operation 602, the computing device system 202 includes means, such as the processor 204, memory 206, input/output circuitry 208, communications circuitry 210, external communications platform circuitry 212, and/or data storage circuitry 214, or any combination thereof, that extracts request record data from one or more support request record files associated with one or more prior client support sessions, where the one or more support request record files comprise audio files, video files, and transcription files. For example, the client communications service component 108 of the external communications support request routing system 101 can harvest request record files comprising request record data (e.g., request record data 412) associated with one or more client support session(s) 410 and store the request record data in a communications data store (e.g., communications data store 114). The request record data 412 is associated with the one or more client support session(s) 410 facilitated by the external communications support request routing system 101 and can comprise any audio data, video data, chat transcription data, SMS transcription data, email transcription data, and/or the like, along with any corresponding timestamp data associated with the one or more client support session(s) 410 facilitated by the external communications support request routing system 101.

At operation 604, the computing device system 202 includes means, such as the processor 204, memory 206, input/output circuitry 208, communications circuitry 210, external communications platform circuitry 212, and/or data storage circuitry 214, or any combination thereof, that trains a predictive machine learning model on a training data set, where the training data set comprises the support request record data. For example, the request record data 412 can be employed as a training data set by a predictive machine learning model 414 in order to generate insight data associated with the external communications support request routing system 101. Additionally or alternatively, any data comprised in the configuration data store 106, the on-call schedule data store 110, and/or the communications data store 114 of the external communications support request routing system 101 can also be employed by the predictive machine learning model 414 as training data.

At operation 606, the computing device system 202 includes means, such as the processor 204, memory 206, input/output circuitry 208, communications circuitry 210, external communications platform circuitry 212, and/or data storage circuitry 214, or any combination thereof, that employs the predictive machine learning model to generate insight data related to the user-defined external support request routing platform, where the insight data comprises usage statistics and recommendations, and where the recommendations are associated with improving the efficiency of a user-defined external support request routing platform, optimizing costs, reducing operational redundancy, and increasing scalability. Additionally, the insight data generated by the predictive machine learning model 414 can be configured on an interactive interface rendered by the support computing device 118 such that an interaction with the interactive interface can cause the execution of one or more portions of executable program code related to employing the recommendations associated with the insight data in the external communications support request routing system 101. For example, employing one or more of the recommendations comprised in the insight data may cause an update to the one or more components and/or to the support communications platform integration, thereby re-configuring the external communications support request routing system 101 for optimal performance and efficiency.

In an exemplary external communications support request routing system 101, the associated predictive machine learning model 414 can be iteratively updated such that the more the external communications support request routing system 101 is employed, the more accurate the insight data becomes. For example, the more request record data harvested by the external communications support request routing system 101 (e.g., request record data 412) and stored in a communications data store (e.g., communications data store 114), and/or the more external communications platform integration data stored in a configuration data store (e.g., configuration data store 106), the larger the training data set for the predictive machine learning model 414 will be. In this regard, improvements to computer efficiency, as well as the external communications support request routing system 101 itself, are made by reducing the time and resources necessary to interpret and extrapolate actionable insights from the insight data.

Conclusion

Although an example processing system has been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a repository management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client computing device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client computing device (e.g., for purposes of displaying information/data to and receiving user input from a user interacting with the client computing device). Information/data generated at the client computing device (e.g., a result of the user interaction) can be received from the client computing device at the server.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. A computer-implemented method, the method comprising:
   receiving, via an external communications support request routing system, a support communications integration definition object comprising an external communications platform type identifier, an external communications platform address, and an external communications platform credential, wherein the external communications platform credential comprises an external communications platform provider identifier and an authentication key associated with the external communications platform provider identifier;
   updating a support communications platform integration in a configuration data store in response to receiving the support communications integration definition object, wherein updating the support communications platform integration comprises at least one of:
   updating an external communications platform type set to include the external communications platform type identifier,
   updating an external communications platform provider set to include the external communications platform provider identifier,
   updating an external communications platform address set to include the external communications platform address, and
   updating an external communications platform credential set to include the external communications platform credential;
   parsing a client support request to identify support routing data;
   determining a designated external communications platform address and a designated external communications platform credential from the support communications platform integration based on the support routing data; and
   causing output of the client support request to the designated external communications platform address.

2. The method of claim 1, wherein the designated external communications platform address is associated with the designated external communications platform credential, the method further comprising:
   validating the designated external communications platform address, wherein the designated external communications platform address comprises at least one of a unique IP address, MAC address, API endpoint address, network component address, server system address, email address, phone number, or any other unique computer-readable address associated with a particular external communications platform; and
   validating the designated external communications platform credential, wherein the designated external communications platform credential comprises a particular external communications platform provider identifier and an authentication key associated with the particular external communications platform provider identifier.

3. The method of claim 1, wherein causing the output of the client support request includes initiating a client support session in association with the designated external communications platform address.

4. The method of claim 3, wherein the external communications platform provider set comprises one or more external communications platform provider identifiers associated with one or more respective external communications platform providers offering at least one service related to facilitating a phone call, VOIP call, video call, group chat channel, email channel, or direct SMS messaging channel, and wherein the client support session comprises an engagement of the at least one service provided by the one or more respective external communications platform providers.

5. The method of claim 3, wherein initiating the client support session in association with the designated external communications platform address further comprises:
   connecting a client computing device associated with a particular external communications platform provider to one or more support computing devices associated with the external communications support request routing system, wherein the client computing device is associated with the designated external communications platform address.

6. The method of claim 5, the method further comprising:
   connecting the client computing device to the one or more support computing devices based on an on-call support device schedule, wherein the on-call support device schedule comprises an active list of the one or more support computing devices that are capable of communicating to the client computing device.

7. The method of claim 3, the method further comprising:
   extracting request record data from one or more support request record files associated with one or more prior client support sessions, wherein the one or more support request record files comprise audio files, video files, and transcription files, the method further comprising:
   training a predictive machine learning model on a training data set, wherein the training data set comprises the request record data.

8. The method of claim 7, the method further comprising:
   employing the predictive machine learning model to generate insight data related to the external communications support request routing system, wherein the insight data comprises usage statistics and recommendations to optimize operational efficiency, costs, and scalability of the external communications support request routing system; and
   updating the support communications platform integration based on the insight data generated by the predictive machine learning model.

9. A computer program product, the computer program product comprising at least one non-transitory computer-readable storage medium having computer-readable program code portions stored therein, the computer-readable program code portions configured to:
   receive, via an external communications support request routing system, a support communications integration definition object comprising an external communications platform type identifier, an external communications platform address, and an external communications platform credential, wherein the external communications platform credential comprises an external communications platform provider identifier and an authentication key associated with the external communications platform provider identifier;
   update a support communications platform integration in a configuration data store in response to receiving the support communications integration definition object, wherein updating the support communications platform integration comprises at least one of:
update an external communications platform type set to include the external communications platform type identifier,
update an external communications platform provider set to include the external communications platform provider identifier,
update an external communications platform address set to include the external communications platform address, and
update an external communications platform credential set to include the external communications platform credential;
parse a client support request to identify support routing data;
determine a designated external communications platform address and a designated external communications platform credential from the support communications platform integration based on the support routing data; and
cause output of the client support request to the designated external communications platform address.

10. The computer program product of claim 9, wherein the designated external communications platform address is associated with the designated external communications platform credential, the computer-readable program code portions further configured to:
validate the designated external communications platform address, wherein the designated external communications platform address comprises at least one of a unique IP address, MAC address, API endpoint address, network component address, server system address, email address, phone number, or any other unique computer-readable address associated with a particular external communications platform; and
validate the designated external communications platform credential, wherein the designated external communications platform credential comprises a particular external communications platform provider identifier and an authentication key associated with the particular external communications platform provider identifier.

11. The computer program product of claim 9, wherein the computer-readable program code portions configured to cause the output of the client support request are further configured to:
initiate a client support session in association with the designated external communications platform address.

12. The computer program product of claim 11, wherein the external communications platform provider set comprises one or more external communications platform provider identifiers associated with one or more respective external communications platform providers offering at least one service related to facilitating a phone call, VOIP call, video call, group chat channel, email channel, or direct SMS messaging channel, and wherein the client support session comprises an engagement of the at least one service provided by the one or more respective external communications platform providers.

13. The computer program product of claim 11, wherein the computer-readable program code portions configured to initiate the client support session in association with the designated external communications platform address are further configured to:
connect a client computing device associated with a particular external communications platform provider to one or more support computing devices associated with the external communications support request routing system, wherein the client computing device is associated with the designated external communications platform address.

14. The computer program product of claim 13, wherein the computer-readable program code portions further configured to:
connect the client computing device to the one or more support computing devices based on an on-call support device schedule, wherein the on-call support device schedule comprises an active list of the one or more support computing devices that are capable of communicating to the client computing device.

15. The computer program product of claim 11, wherein the computer-readable program code portions further configured to:
extract request record data from one or more support request record files associated with one or more prior client support sessions, wherein the one or more support request record files comprise audio files, video files, and transcription files; and
train a predictive machine learning model on a training data set, wherein the training data set comprises the request record data.

16. The computer program product of claim 15, wherein the computer-readable program code portions further configured to:
employ the predictive machine learning model to generate insight data related to the external communications support request routing system, wherein the insight data comprises usage statistics and recommendations to optimize operational efficiency, costs, and scalability of the external communications support request routing system; and
update the support communications platform integration based on the insight data generated by the predictive machine learning model.

17. A system comprising one or more computers and one or more storage devices storing instructions that are operable, when executed by the one or more computers, to cause the one or more computers to:
receive, via an external communications support request routing system, a support communications integration definition object comprising an external communications platform type identifier, an external communications platform address, and an external communications platform credential, wherein the external communications platform credential comprises an external communications platform provider identifier and an authentication key associated with the external communications platform provider identifier;
update a support communications platform integration in a configuration data store in response to receiving the support communications integration definition object, wherein updating the support communications platform integration comprises at least one of:
update an external communications platform type set to include the external communications platform type identifier,
update an external communications platform provider set to include the external communications platform provider identifier,
update an external communications platform address set to include the external communications platform address, and update an external communications platform credential set to include the external communications platform credential;

parse the client support request to identify support routing data;

determine a designated external communications platform address and a designated external communications platform credential from the support communications platform integration based on the support routing data; and cause output of the client support request to the designated external communications platform address.

18. The system of claim 17, wherein the designated external communications platform address is associated with the designated external communications platform credential, the instructions further configured to cause the one or more computers to:

validate the designated external communications platform address, wherein the designated external communications platform address comprises at least one of a unique IP address, MAC address, API endpoint address, network component address, server system address, email address, phone number, or any other unique computer-readable address associated with a particular external communications platform; and validate the designated external communications platform credential, wherein the designated external communications platform credential comprises a particular external communications platform provider identifier and an authentication key associated with the particular external communications platform provider identifier.

19. The system of claim 17, wherein the instructions configured to cause the one or more computers to cause the output of the client support request are further configured to:

initiate a client support session in association with the designated external communications platform address; and in response to initiating the client support session, connect a client computing device associated with a particular external communications platform provider to one or more support computing devices associated with the external communications support request routing system, wherein the client computing device is associated with the designated external communications platform address.

20. The system of claim 19, wherein the instructions are further configured to cause the one or more computers to:

extract request record data from one or more support request record files associated with one or more prior client support sessions, wherein the one or more support request record files comprise audio files, video files, and transcription files;

train a predictive machine learning model on a training data set, wherein the training data set comprises the request record data; and employ the predictive machine learning model to generate insight data related to the external communications support request routing system, wherein the insight data comprises usage statistics and recommendations to optimize operational efficiency, costs, and scalability of the external communications support request routing system; and update the support communications platform integration based on the insight data generated by the predictive machine learning model.

* * * * *